United States Patent [19]

(12) United States Patent
Morimoto et al.

(10) Patent No.: US 11,509,786 B2
(45) Date of Patent: Nov. 22, 2022

(54) DOCUMENT FEEDER AND IMAGE FORMING APPARATUS

(71) Applicant: SHARP KABUSHIKI KAISHA, Sakai (JP)

(72) Inventors: Yasumasa Morimoto, Sakai (JP); Hironori Ogasawara, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 17/351,754

(22) Filed: Jun. 18, 2021

(65) Prior Publication Data

US 2022/0021778 A1    Jan. 20, 2022

(30) Foreign Application Priority Data

Jul. 15, 2020 (JP) .............................. JP2020-121298

(51) Int. Cl.
*H04N 1/04* (2006.01)
*H04N 1/00* (2006.01)

(52) U.S. Cl.
CPC ..... *H04N 1/00745* (2013.01); *H04N 1/00543* (2013.01); *H04N 1/00602* (2013.01); *H04N 1/00689* (2013.01); *H04N 1/00694* (2013.01); *H04N 1/00705* (2013.01); *H04N 1/00748* (2013.01)

(58) Field of Classification Search
CPC ........... H04N 1/00745; H04N 1/00543; H04N 1/00602; H04N 1/00689; H04N 1/00692; H04N 1/00694; H04N 1/00705; H04N 1/00748
See application file for complete search history.

(56) References Cited

U.S. PATENT DOCUMENTS

| 2005/0023743 | A1* | 2/2005 | Fujii | ................. | B65H 3/06 271/157 |
| 2005/0263955 | A1* | 12/2005 | Kim | ................. | B65H 3/0684 271/121 |

FOREIGN PATENT DOCUMENTS

| JP | 2000-095359 A | 4/2000 |
| JP | 2006-056684 A | 3/2006 |

* cited by examiner

*Primary Examiner* — Moustapha Diaby
(74) *Attorney, Agent, or Firm* — ScienBiziP, P.C.

(57) ABSTRACT

A document feeder includes an apparatus body to which a document feed unit is attached, a sheet feed tray that moves up and down toward the document feed unit, an open/close cover attached openably and closably to the apparatus body and opens the document transport path and the document feed unit when opened, and a unit pressing arm attached to the open/close cover. When the open/close cover is closed, the unit pressing arm presses the document feed unit toward the sheet feed tray.

14 Claims, 14 Drawing Sheets

DOCUMENT FEEDER AND IMAGE FORMING APPARATUS

BACKGROUND OF THE INVENTION

Field of the Invention

The present invention relates to a document feeder that feeds a document on a sheet feed tray into a document transport path, and also relates to an image forming apparatus.

Description of the Background Art

A typical document feeder that has been known is provided in an image forming apparatus to pull in a document loaded on a sheet feed tray, read the document, and then eject the document on an ejection tray. The document feeder includes a lift plate or the like to lift the document and brings it into contact with a sheet feed roller provided above, and the document feeder can automatically start feeding the document regardless of the amount of documents loaded on the sheet feed tray (see, for example, Japanese Unexamined Patent Application Publication Nos. 2000-95359 and 2006-56684).

The automatic document feeder described in Japanese Unexamined Patent Application Publication No. 2000-95359 includes a document table that accommodates a plurality of documents in a stacked state, a bottom plate that lifts the documents on the document table, a loading height sensor that detects the height of the documents on the document table, and a control unit that sets an amount of movement of the bottom plate.

The document feeder described in Japanese Unexamined Patent Application Publication No. 2006-56684 includes a document load section having a lift plate on which a document is loaded and which moves up and down, a sheet feed section disposed above the lift plate, a detection unit that detects an upward force against the sheet feed section, and a lift plate driving unit that lowers the lift plate.

A paper jam may occur in the course of pulling the document into the document feeder. To remove a piece of paper or the like, it is desired to open the sheet feed section. The automatic document feeder or the like described above controls the height of the bottom plate (lift plate) to prevent damage to the apparatus and to shorten the printing time, but does not provide a structure to open the sheet feed section.

The present invention has been made to solve the above problem, and it is an object of the present invention to provide a document feeder including an open/close cover provided to facilitate handling of paper jams, while avoiding interference (collision) between various parts in opening and closing, and also provide an image forming apparatus.

SUMMARY OF THE INVENTION

A document feeder according to one aspect of the present invention is equipped with a document feed unit that feeds a document into a document transport path, and includes an apparatus body to which the document feed unit is attached, a sheet feed tray that moves up and down toward the document feed unit and on which the document is placed, an open/close cover attached openably and closably to the apparatus body and, when opened, opening the document transport path and the document feed unit, and a unit pressing member attached to the open/close cover, in which the unit pressing member presses the document feed unit toward the sheet feed tray when the open/close cover is closed.

The document feeder according to the one aspect of the present invention may include a detection sensor attached to the open/close cover, and a detection piece formed on the unit pressing member and detected by the detection sensor, in which the document feeder determines a position of the document feed unit in accordance with a detection result of the detection sensor.

In the document feeder according to the one aspect of the present invention, the sheet feed tray may lift a leading edge side of the loaded document and bring the document into contact with the document feed unit.

The document feeder according to the one aspect of the present invention may include a sheet feed shaft pivotally supported by the apparatus body, a sheet feed roller attached to the sheet feed shaft, an intake roller rotated by a force transmitted via the sheet feed shaft, and a driving section that causes the sheet feed shaft to rotate, in which the document feed unit pivotally supports the intake roller, swings about the sheet feed shaft as a fulcrum, and moves the intake roller toward and away from the sheet feed tray.

In the document feeder according to the one aspect of the present invention, the unit pressing member may include an extending member pivotally supported by the open/close cover at one end and having a pressing member at the other end, the document feed unit may include a unit contact member that comes into contact with the pressing member at an end portion separated from the sheet feed shaft, and the extending member may extend in an extending direction between the sheet feed shaft and the unit contact member which face each other.

The document feeder according to the present invention may include a biasing member that biases the pressing member in a direction in of pressing the unit contact member, in which the unit pressing member has a bias connecting member extending in a direction intersecting the extending direction, and the biasing member is attached to the open/close cover at one end and attached to the bias connecting member at the other end.

In the document feeder according to the one aspect of the present invention, the extending member may be formed at two locations across the document feed unit in an axial direction along the sheet feed shaft, with the pressing member extending from the other end of each extending member, and the pressing member may be longer than the unit contact member in the axial direction.

An image forming apparatus according to another aspect of the present invention includes the document feeder according to the one aspect of the present invention.

According to the present invention, the document feed unit is provided separately from the open/close cover and is left on the apparatus body side when the open/close cover is opened/closed. This achieves the position accuracy of the document feed unit and improves the sheet feed and sheet transport performance for the high-speed transport and the large-capacity document tray. By attaching peripheral members around the document feed unit to the open/close cover, the peripheral portions of the document feed unit are exposed when the open/close cover is opened/closed. This facilitates solving the paper jams.

DESCRIPTION OF THE PREFERRED EMBODIMENTS

An image forming apparatus according to an embodiment of the present invention will be described below with reference to the accompanying drawings.

Figure 1:
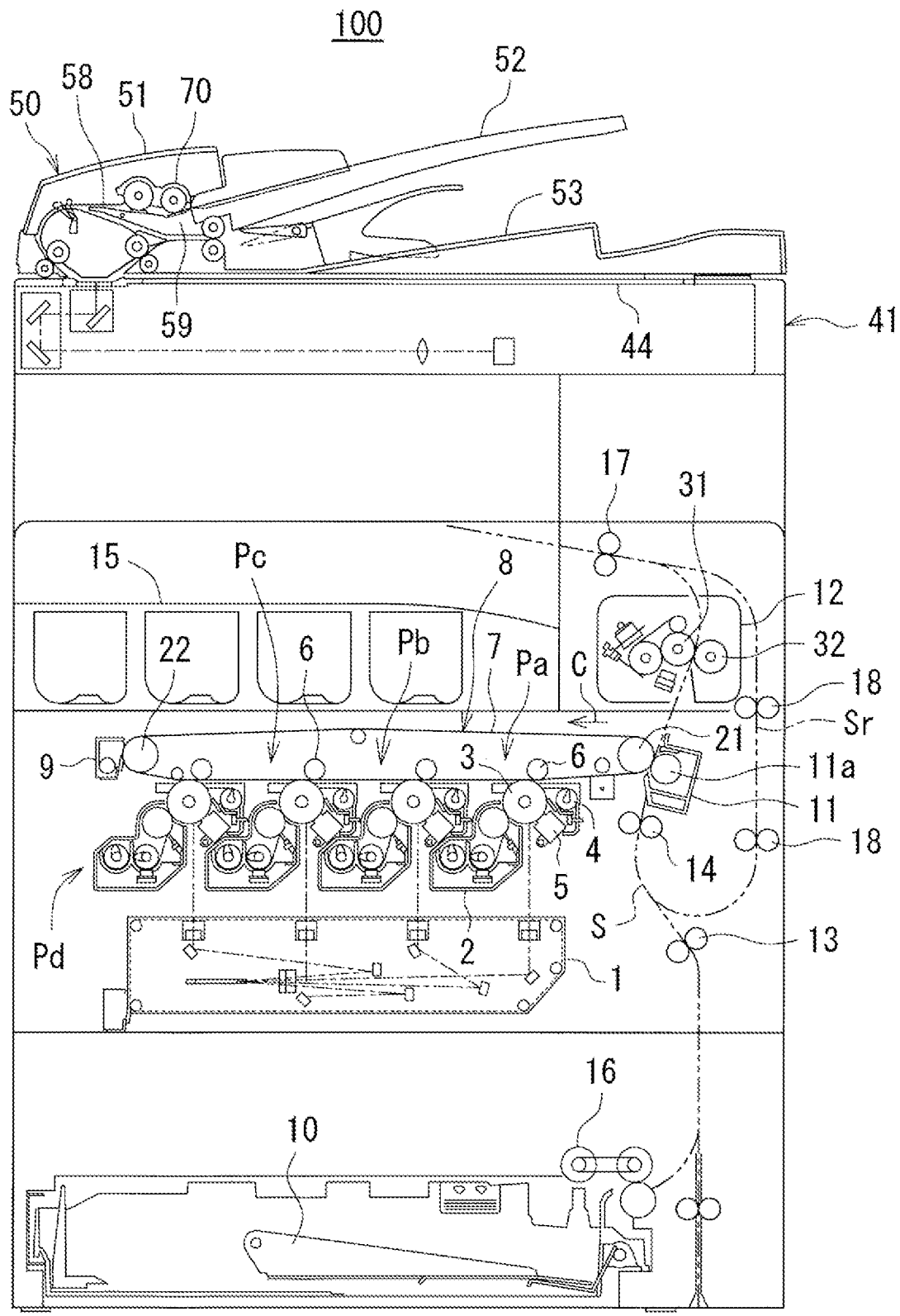
FIG. 1 is a schematic side view of an image forming apparatus according to an embodiment of the present invention.
Figure 2:
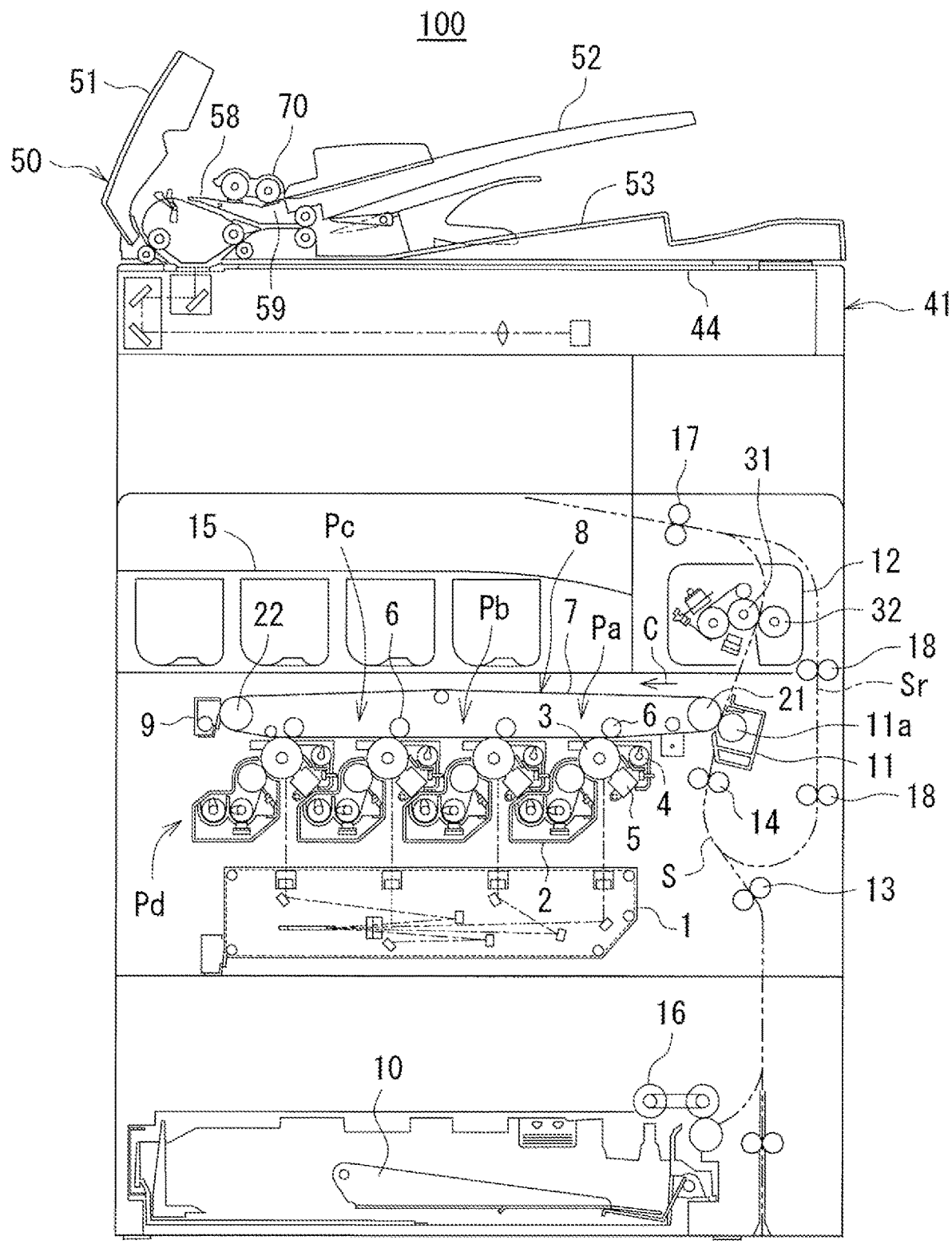
FIG. 2 is a schematic side view showing a state where an open/close cover of the image forming apparatus of FIG. 1 is opened.

FIG. 1 is a schematic side view of the image forming apparatus according to the embodiment of the present invention. FIG. 2 is a schematic side view showing a state where the open/close cover of the image forming apparatus of FIG. 1 is opened.

An image forming apparatus 100 is a multifunctional machine having a scanner function, a copying function, a printer function, a facsimile function, and the like to read an image of a document by an image reader 41 and transmit the image to an external device (corresponding to the scanner function), and form an image of the document read or an image received from the external device on a sheet of paper in color or monochrome (corresponding to the copy function, printer function, and facsimile function).

A document feeder (ADF) 50 is provided on the upper side of the image reader 41 and is supported openably and closably with respect to the image reader 41. When the document feeder 50 is opened, a document loading table 44 disposed above the image reader 41 is released to allow a document to be loaded by hand. The document feeder 50 automatically transports the loaded document to the top of the image reader 41. The image reader 41 reads the loaded document or the document transported from the document feeder 50 and generates image data.

The document feeder 50 includes a sheet feed tray 52 on which the document is loaded, an ejection tray 53 on which the documents is ejected, a document transport path 58 on which the document is transported, a document feed unit 70 that feeds the document on the sheet feed tray 52 into the document transport path 58, an apparatus body 59 to which the document feed unit 70 is attached, and an open/close cover 51 attached openably and closably to the apparatus body 59. As shown in FIG. 2, the document transport path 58 is exposed when the open/close cover 51 opens. The document feeder 50 will be described in detail later with reference to FIGS. 3 to 6 described later.

The image forming apparatus 100 includes an optical scanner 1, a developer 2, a photoconductor drum 3 (an example of a photoconductor), a drum cleaner 4, a charger 5, an intermediate transfer belt 7, a fixing unit 12, and a sheet transport path S, a sheet feed cassette 10, a loading tray 15, and the like.

The image forming apparatus 100 handles image data of a color image using black (K), cyan (C), magenta (M), and yellow (Y), or a monochrome image using a single color (e.g., black). The image forming apparatus 100 includes four developers 2, four photoconductor drums 3, four drum cleaners 4, and four chargers 5, corresponding to black, cyan, magenta, and yellow for forming four types of toner images, to provide four image stations Pa, Pb, Pc, and Pd.

The drum cleaner 4 removes and recovers residual toner left on the surface of the photoconductor drum 3. The charger 5 uniformly charges the surface of the photoconductor drum 3 to a predetermined potential. The optical scanner 1 exposes the surface of each photoconductor drum 3 to form an electrostatic latent image. The developer 2 develops the electrostatic latent image on the surface of each photoconductor drum 3 to form a toner image thereon. These operations are performed sequentially to form the toner image of each color on the surface of each photoconductor drums 3.

A transfer belt device 8 is provided above the photoconductor drums 3, and intermediate transfer rollers 6 are provided via an intermediate transfer belt 7. The intermediate transfer belt 7 stretches over a transfer driving roller 21 and a transfer driven roller 22, and moves around in the direction of an arrow C to cause a belt cleaner 9 to remove and recover the residual toner. The toner image of each color formed on each photoconductor drum 3 is sequentially transferred and superposed on top of each other to form a color toner image on the surface of the intermediate transfer belt 7.

A nip area (secondary transfer position) is formed between the intermediate transfer belt 7 and a transfer roller 11a of a secondary transfer section 11 to transport the sheet, which has been conveyed through the sheet transport path S, by pinching the sheet in the nip area. When the sheet passes through the nip area, the toner image on the surface of the intermediate transfer belt 7 is transferred, and the sheet is conveyed to the fixing unit 12.

The fixing unit 12 includes a fusing roller 31 and a pressure roller 32 that rotate on both sides of the sheet. The fixing unit 12 pinches the sheet on which the toner image is transferred between the fusing roller 31 and the pressure roller 32, and heats and pressurizes the sheet to fix the toner image on the sheet.

The sheet feed cassette 10 is a cassette that stores sheets of paper used for image formation and is disposed under the optical scanner 1. The sheets are pulled out from the sheet feed cassette 10 by a sheet pickup roller 16 and transported through the sheet transport path S by passing through the secondary transfer section 11 and the fixing unit 12 to reach the loading tray 15 via the sheet ejection rollers 17. Provided on the sheet transport path S are sheet resist rollers 14 that temporarily stop the sheet and align the leading edge of the sheet, and restart transport of the sheet in time with the transfer timing of the color toner image in the nip area between the intermediate transfer belt 7 and the transfer roller 11*a*. Transport rollers 13 that facilitates transport of the sheet, and the sheet ejection rollers 17 are also provided.

To form the image on the back side as well as the front side of the sheet, the sheet is transported in the reverse direction from the sheet ejection rollers 17 to a sheet reversing path Sr. On the sheet reversing path Sr, the front and back sides of the sheet are reversed through the reversing rollers 18, and the sheet is guided to the sheet resist rollers 14 again. After that, an image is formed on the back side in the same manner as on the front side, and the sheet is transported to the loading tray 15.

Figure 3:
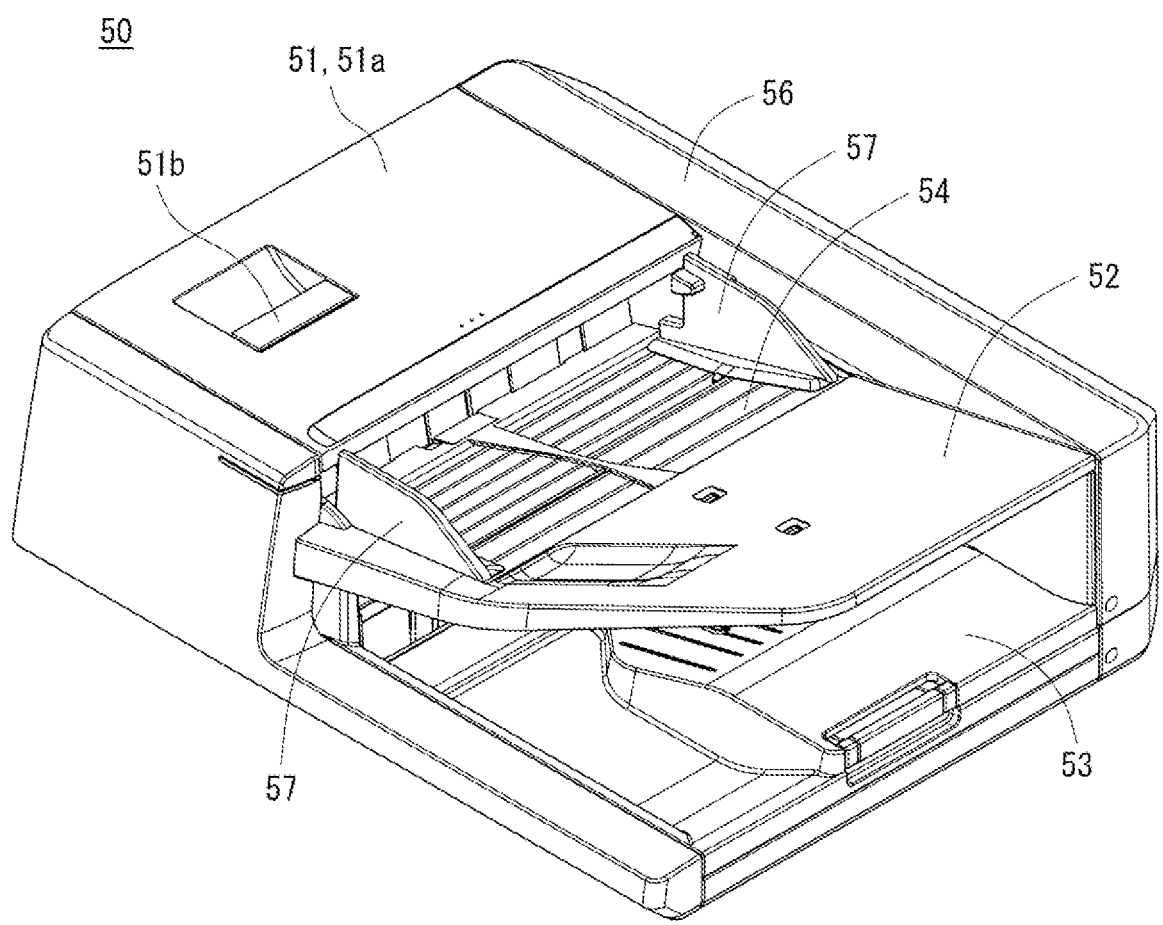
FIG. 3 is a perspective view showing a document feeder according to an embodiment of the present invention.
Figure 4:
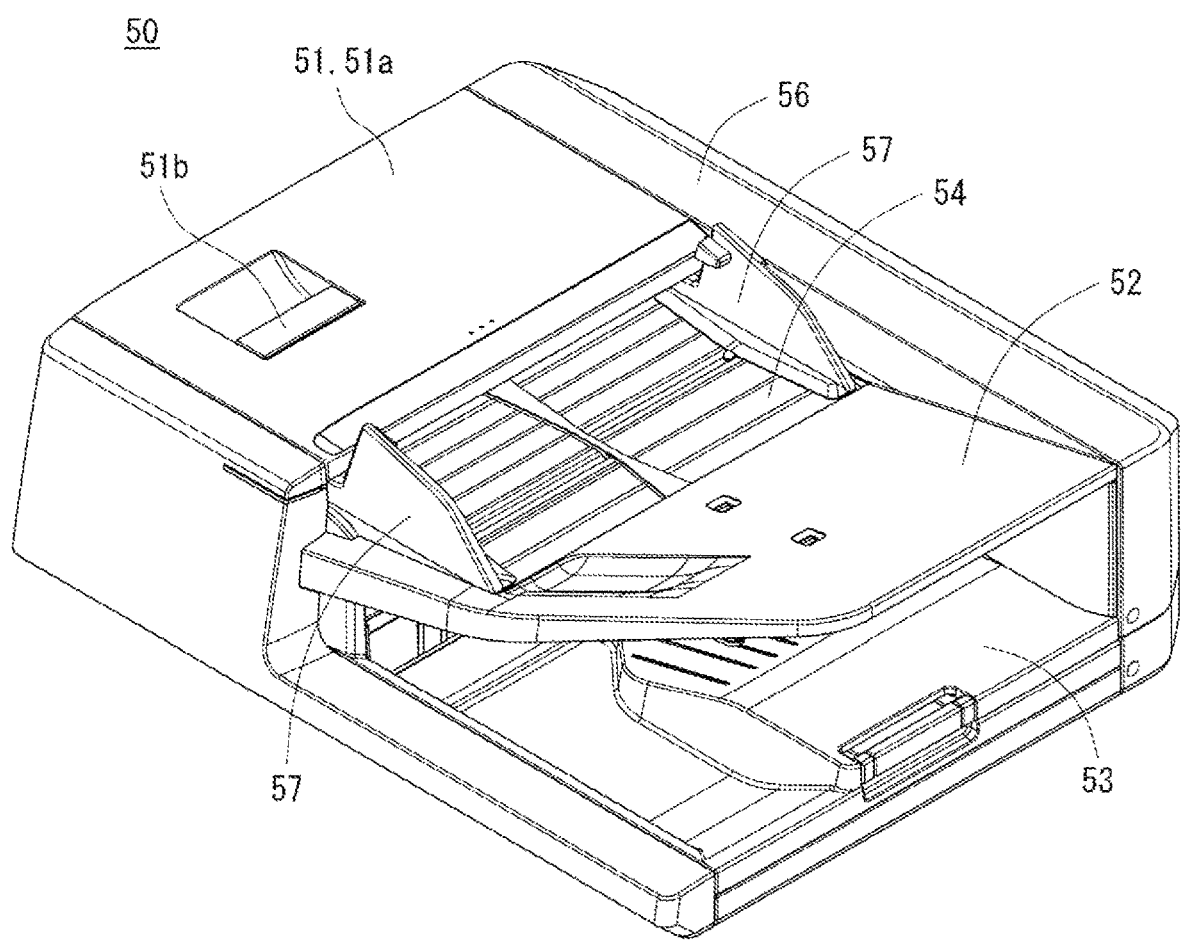
FIG. 4 is a perspective view showing a state where a sheet feed guide plate of the document feeder of FIG. 3 is lifted.

FIG. 3 is a perspective view showing the document feeder according to the embodiment of the present invention. FIG. 4 is a perspective view showing a state where the sheet feed guide plate of the document feeder of FIG. 3 is lifted.

The document feeder 50 includes the open/close cover 51 at one end (upper left side in FIG. 3), and the sheet feed tray 52 and the ejection tray 53 at the other end (lower right side in FIG. 3). The sheet feed tray 52 and the ejection tray 53 are aligned in the height direction, and the sheet feed tray 52 is located on the top and the ejection tray 53 is located on the bottom. The document feed unit 70 that feeds the documents on the sheet feed tray 52 into the document transport path 58 is provided in a portion covered with the open/close cover 51 in the closed state.

The sheet feed tray 52 inclines so that the end portion facing the open/close cover 51 is lowered. Specifically, the sheet feed tray 52 inclines to allow the document to slide toward the open/close cover 51 due to the own weight of the document when loaded on the sheet feed tray 52. A sheet feed guide plate 54 is provided at the end of the sheet feed tray 52 on the open/close cover 51 side. The sheet feed guide plate 54 lifts the leading edge side of the loaded sheet and brings it into contact with the document feed unit 70. Specifically, as shown in FIG. 3, the sheet feed guide plate 54 inclines, when lowered, at substantially the same degree as the sheet feed tray 52. Then, as shown in FIG. 4, the sheet feed guide plate 54 changes its inclination angle to lift the end portion on the open/close cover 51 side, and lifts up the leading edge side of the document. Although the sheet feed guide plate 54, which is a part of the sheet feed tray 52, is lifted and lowered in the present embodiment, the entire sheet feed tray 52 may be moved up and down toward the document feed unit 70.

The sheet feed tray 52 includes a document guide 57 for aligning side edges of the document in the width direction. The document guide 57 is formed at two locations apart from each other in the width direction to be movable in the width direction at the end portion on the open/close cover 51 side. When the document is loaded on the sheet feed tray 52, the document is pinched between the two document guides 57, and the document guides 57 move until they touch both side edges of the document in the width direction, thus positioning the document in the width direction. The apparatus body 59 includes a portion facing the sheet feed guide plate 54 as a wall surface standing in the height direction, and the leading edge of the document is brought into contact with the wall surface to position the document in the transport direction.

The open/close cover 51 includes an upper housing 51*a* covering the surface when closed, a lower housing 51*c* (see FIG. 6 which is described later) facing the document transport path 58 inside the document feeder 50, and a handhold 51*b* that is held by a user in opening/closing. The handhold 51*b* is movable when held by the user and, when moved, releases the lock of the open/close cover 51 on the apparatus body 59. A spring or the like may be attached to the open/close cover 51 to bias the open/close cover 51 in the opening direction when the lock on the apparatus body 59 is released.

The apparatus body 59 includes a driving section 56. The driving section 56 accommodates, for example, a motor, a gear, a belt, and a clutch, and includes a mechanism for generating a driving force and transmitting the driving force to various parts of the apparatus. The driving section 56 may include other members, and the design may be changed as appropriate depending on the parts that use the driving force from the driving section 56.

Figure 5:
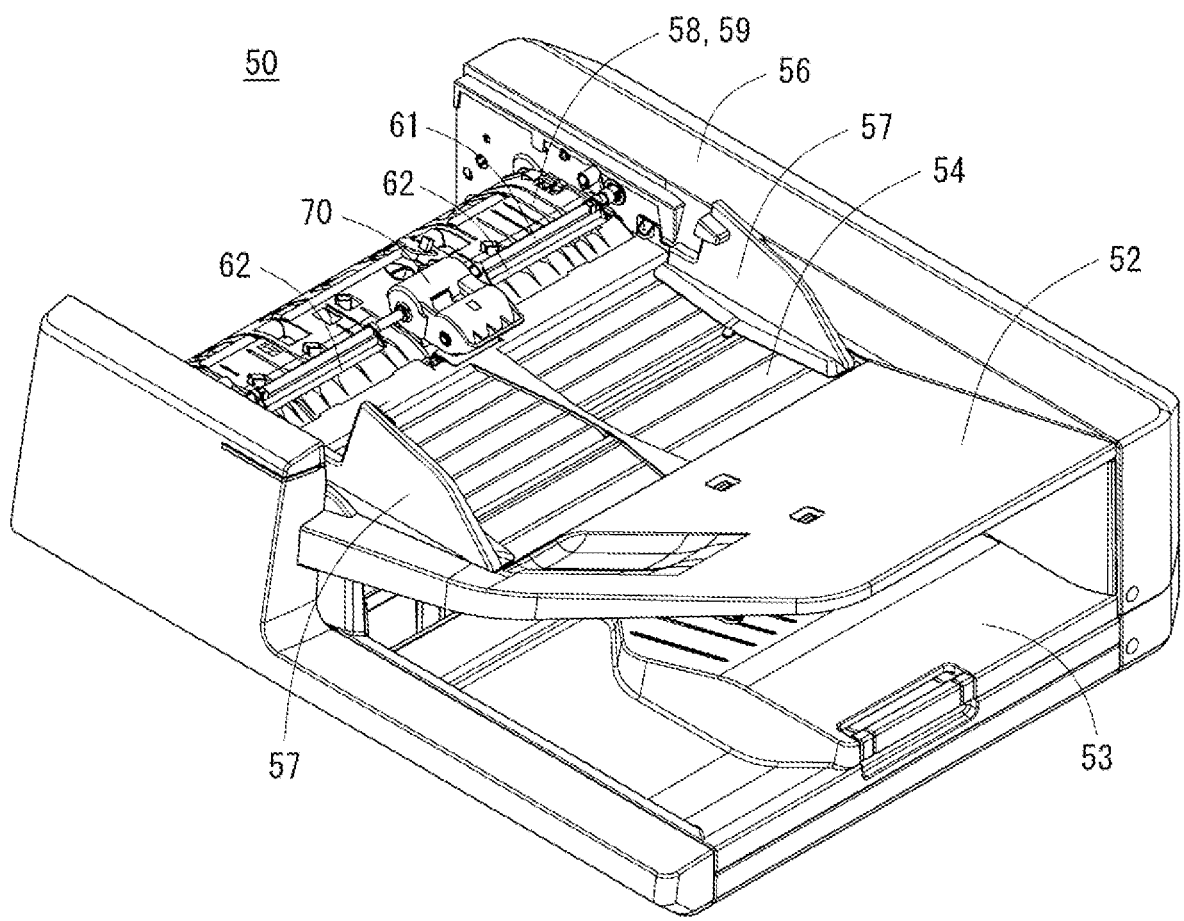
FIG. 5 is a perspective view showing a state where the open/close cover of the document feeder of FIG. 4 is removed.

FIG. 5 is a perspective view showing a state where the open/close cover of the document feeder of FIG. 4 is removed. Although the open/close cover 51 is omitted for ease of viewing in FIG. 5, the open/close cover 51 is pivotally supported at its end by the apparatus body 59 and is not removed from the document feeder 50 when opened.

When the open/close cover 51 is opened, the document transport path 58 covered by the open/close cover 51 is exposed. The apparatus body 59 is pivotally supported by a sheet feed shaft 61 connected to the driving section 56. The sheet feed shaft 61 extends axially in the width direction. The document feed unit 70 is attached to the sheet feed shaft 61 and is located near the center of the document transport path 58 in the width direction. Further, a hanging member 62 is attached to the sheet feed shaft 61 at a position not overlapping the document feed unit 70. The apparatus body 59 may include a sliding member for reducing friction with the document at a portion facing the document feed unit 70. The sliding member may be a flat plate having a small frictional force, or may be a roller that rotates during transport of the document. The document feed unit 70 will be described in detail later with reference to FIGS. 12 and 13.

Figure 6:
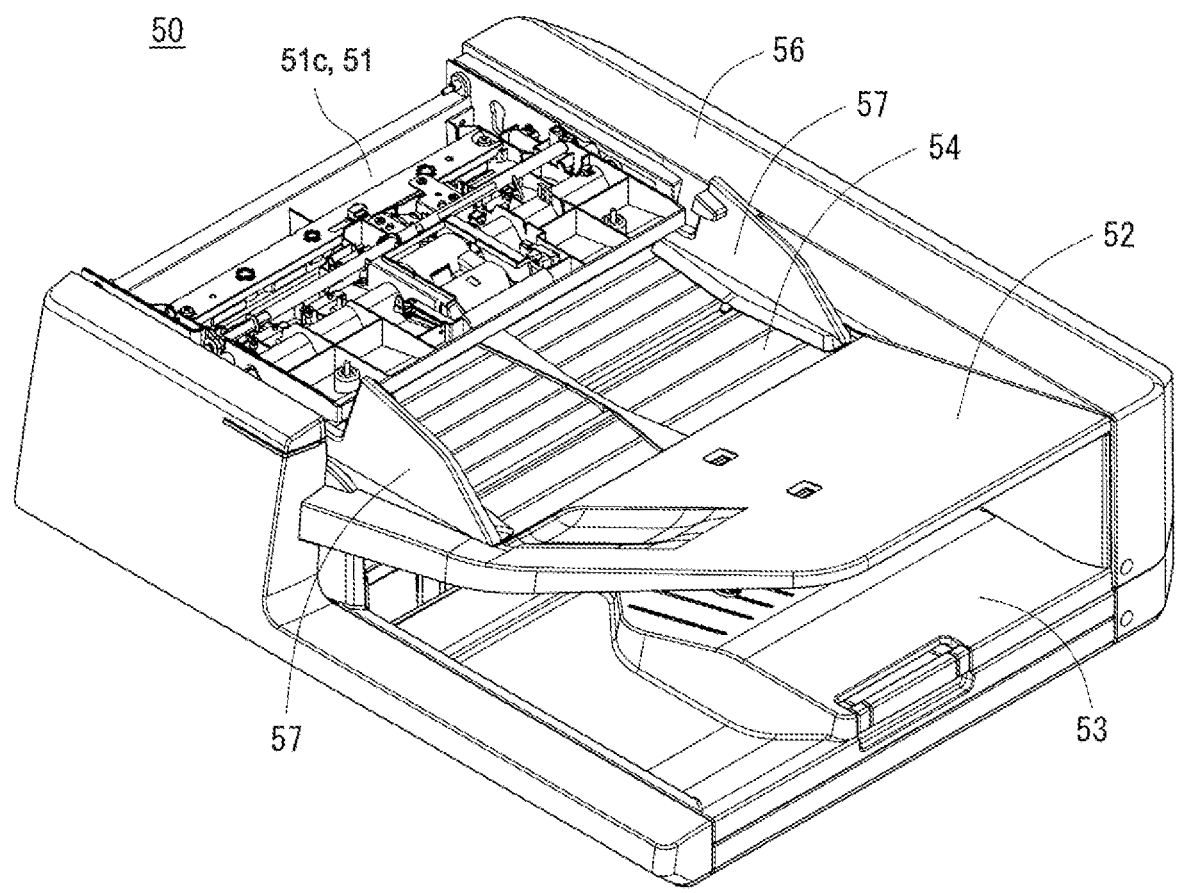
FIG. 6 is a perspective view showing a state where an upper housing of the document feeder of FIG. 4 is removed.
Figure 7:
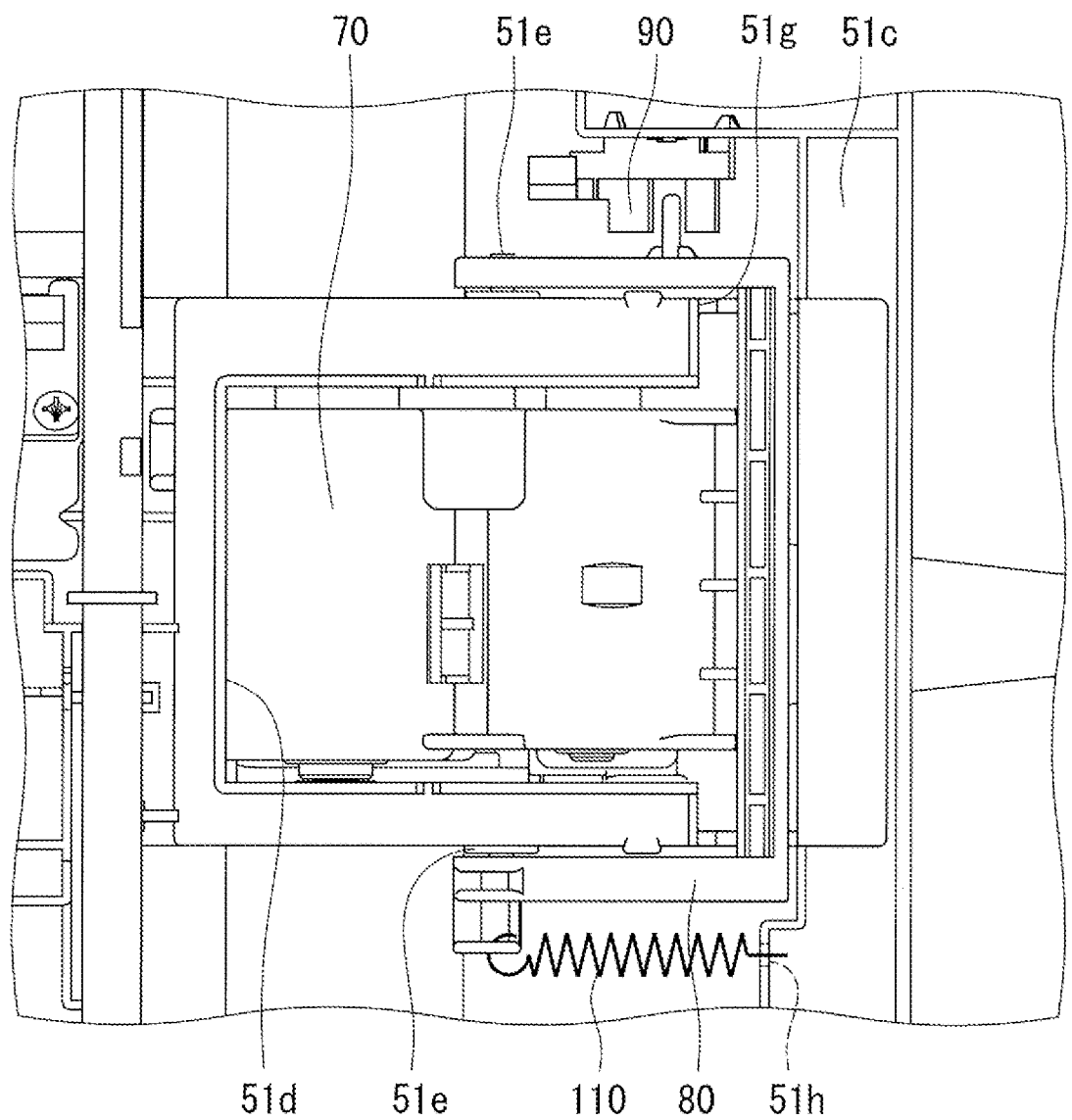
FIG. 7 is an enlarged top view showing the vicinity of the document feed unit of FIG. 6 in an enlarged manner.
Figure 8:
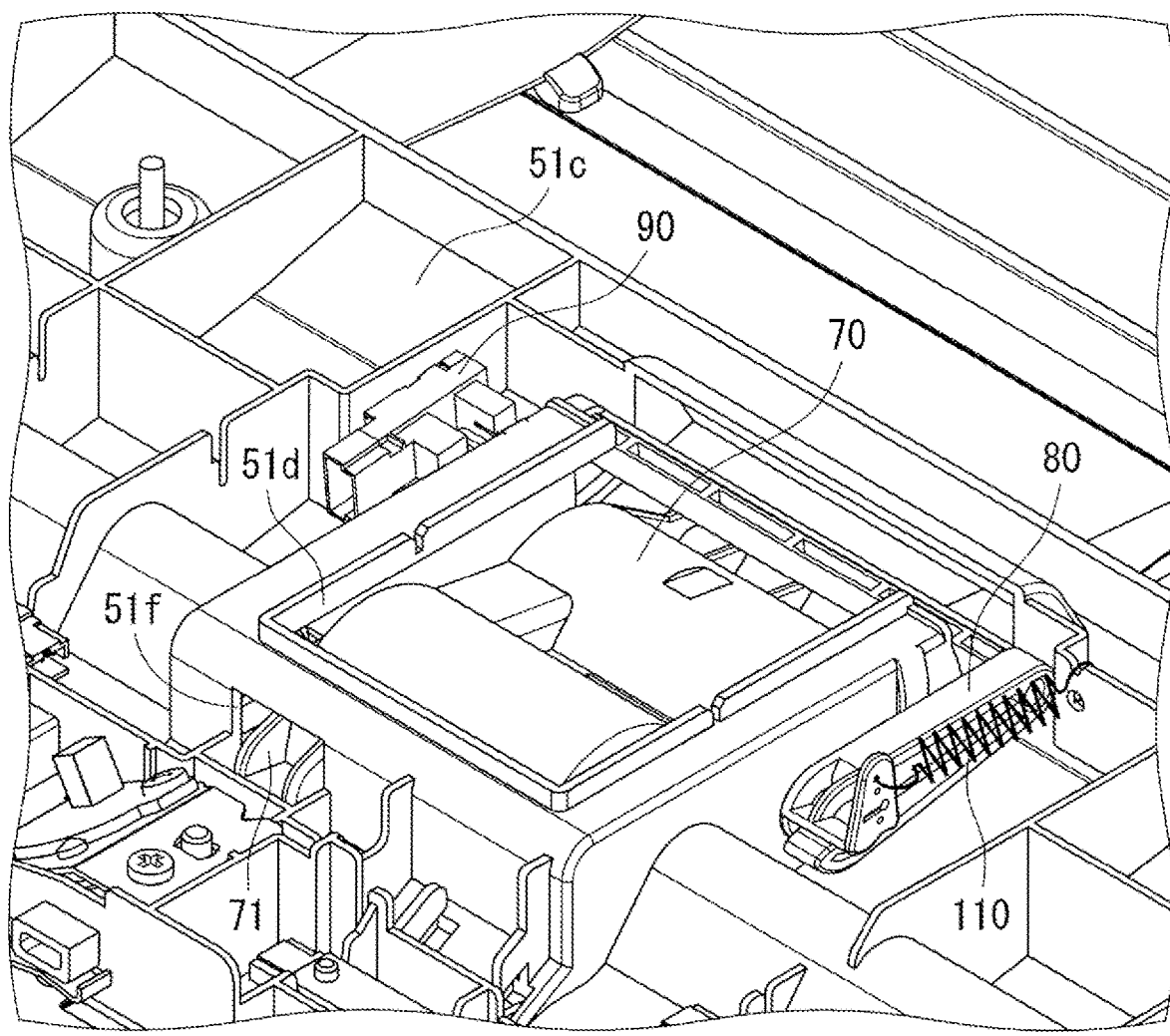
FIG. 8 is an enlarged perspective view showing the vicinity of the document feed unit of FIG. 6 in an enlarged manner.

FIG. 6 is a perspective view showing a state where the upper housing of the document feeder of FIG. 4 is removed. FIG. 7 is an enlarged top view showing the vicinity of the document feed unit of FIG. 6 in an enlarged manner. FIG. 8 is an enlarged perspective view showing the vicinity of the document feed unit of FIG. 6 in an enlarged manner. For ease of viewing the document feed unit 70, the upper housing 51*a* and other members are omitted as appropriate in FIGS. 6 to 8.

As described above, the open/close cover 51 covers the upper part of the document feed unit 70. In the portion covered by the open/close cover 51 in the closed state, the document transport path 58 is provided in a space sandwiched between the lower housing 51*c* and the apparatus body 59. Near the entrance of the document transport path 58, the apparatus body 59 is located below the document transport path 58, and the lower housing 51*c* (the open/close cover 51), the sheet feed shaft 61, and the document feed unit 70 are located above the document transport path 58.

In a conventional structure, the apparatus body 59 is typically provided separately from the open/close cover 51 with the document transport path 58 used as a boundary, and it is a well-known structure that both the sheet feed shaft 61 and the document feed unit 70 are attached to the open/close cover 51. However, in such a conventional structure in which the document feed unit 70 is attached to the open/close cover 51, the document feed unit 70 moves with the open/close cover 51 when it is opened/closed. To mitigate misalignment, more space is needed in positioning the document feed unit 70 during movement relative to the apparatus body 59 by offsetting the position accuracy.

In the present embodiment, the document feed unit 70 is provided separately from the open/close cover 51. When the open/close cover 51 is opened/closed, the document feed unit 70 is left on the apparatus body 59, and the position accuracy of the document feed unit 70 with respect to the apparatus body 59 can be achieved. By attaching the peripheral members around the document feed unit 70 to the open/close cover 51, the peripheral portions of the document feed unit 70 are exposed when the open/close cover 51 is opened. This facilitates solving the paper jams.

To attach the document feed unit 70 to the apparatus body 59, the lower housing 51c has irregularities and openings corresponding to the sheet feed shaft 61 and the document feed unit 70. This prevents the lower housing 51c to interfere (collide) with the sheet feed shaft 61 or the document feed unit 70 when the open/close cover 51 is closed, while narrowing the gap between the lower housing 51c and the apparatus body 59, to minimize flapping of the document.

Specifically, the lower housing 51c includes a unit accommodating section 51d, an arm shaft 51e, a rotation regulating section 51f, an arm passage 51g, and a bias locking portion 51h. The side of the lower housing 51c facing the apparatus body 59 (the external side of the open/close cover 51) may be referred to as a bottom surface, and the side facing the upper housing 51a (the internal side of the open/close cover 51) may be referred to as a top surface.

The unit accommodating section 51d is formed by opening a portion facing the document feed unit 70. The unit accommodating section 51d needs to be shaped not to collide with the document feed unit 70, and may be formed as a recess instead of opening.

The arm shaft 51e is a shaft protruding toward the inside of the open/close cover 51, and a unit pressing arm 80 (an example of a unit pressing member) is attached to the arm shaft 51e. The arm shaft 51e is provided at two locations across the unit accommodating section 51d in the width direction, and the two arm shafts 51e extend along the same straight line. Although the arm shafts 51e are provided on the lower housing 51c in the present embodiment, the arm shafts 51e may be provided as protrusions provided on the unit pressing arm 80, and holes for inserting the arm shafts 51e may be formed in the lower housing 51c.

The document feed unit 70 has a regulating protrusion 71 at the downstream end in the transport direction. A rotation regulating section 51f is a recess formed in the lower housing 51c at a position corresponding to the regulating protrusion 71. The rotation regulating section 51f covers the upper part of the regulating protrusion 71 with a gap formed in the height direction, and the apparatus body 59 is located below the regulating protrusion 71 with a gap in the height direction. The document feed unit 70 rotates about the sheet feed shaft 61, and the regulating protrusion 71 swings to the rotation of the document feed unit 70. When the regulating protrusion 71 swings upward, it comes into contact with the rotation regulating section 51f to stop the rotation of the document feed unit 70. When the regulating protrusion 71 swings downward, it comes into contact with the apparatus body 59 to stop the rotation of the document feed unit 70. Thus, by restricting the rotation range of the document feed unit 70, it is possible to avoid damage to the apparatus due to collision in unintended portions.

The arm passage 51g is formed by opening a portion above the document feed unit 70 and facing the unit pressing arm 80. The unit pressing arm 80 passes through the arm passage 51g and presses the document feed unit 70. The unit pressing arm 80 will be described in detail later with reference to FIGS. 10 and 11.

The bias locking portion 51h is formed on the upper surface side of the lower housing 51c. A biasing member 110 is locked on the bias locking portion 51h at one end and is locked on the unit pressing arm 80 at the other end. The biasing member 110 is, for example, a coil spring that contracts to bias the unit pressing arm 80.

A detection sensor 90 is attached to the upper surface of the lower housing 51c. The detection sensor 90 is, for example, an optical sensor that emits light from a light emitting unit 91 toward a light receiving unit 92, and detects objects depending on whether the light reaches the light receiving unit 92. The relationship between the detection sensor 90 and the unit pressing arm 80 will be described later with reference to FIG. 11.

Figure 9:
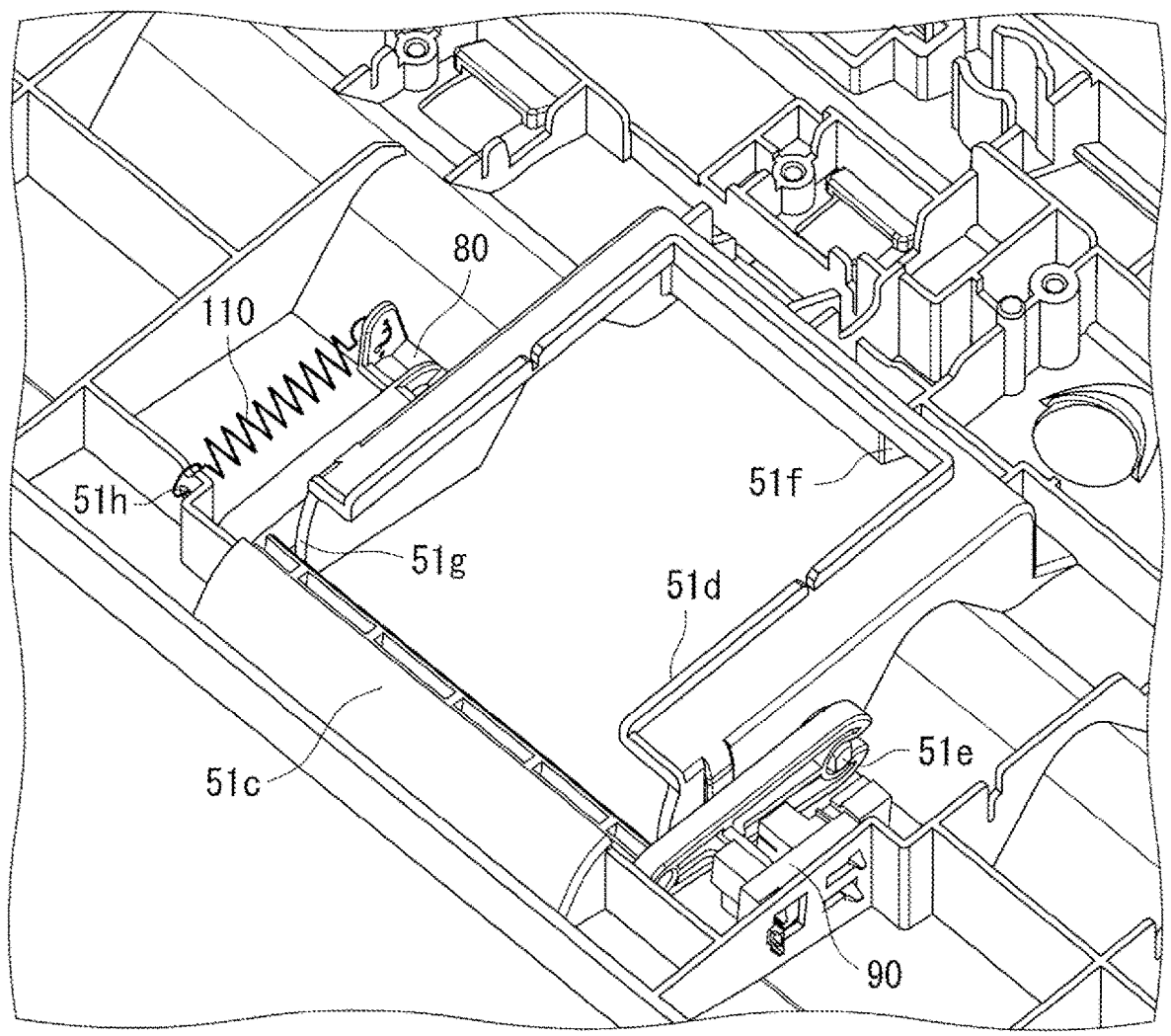
FIG. 9 is an enlarged perspective view showing the vicinity of a unit accommodating section of the lower housing in an enlarged manner.

FIG. 9 is an enlarged perspective view showing the vicinity of the unit accommodating section of the lower housing in an enlarged manner.

FIG. 9 shows the inside of the open/close cover 51 when opened. As described above, the document feed unit 70 attached to the apparatus body 59 does not move, when the open/close cover 51 is opened, and the unit accommodating section 51d is hollowed.

Figure 10:
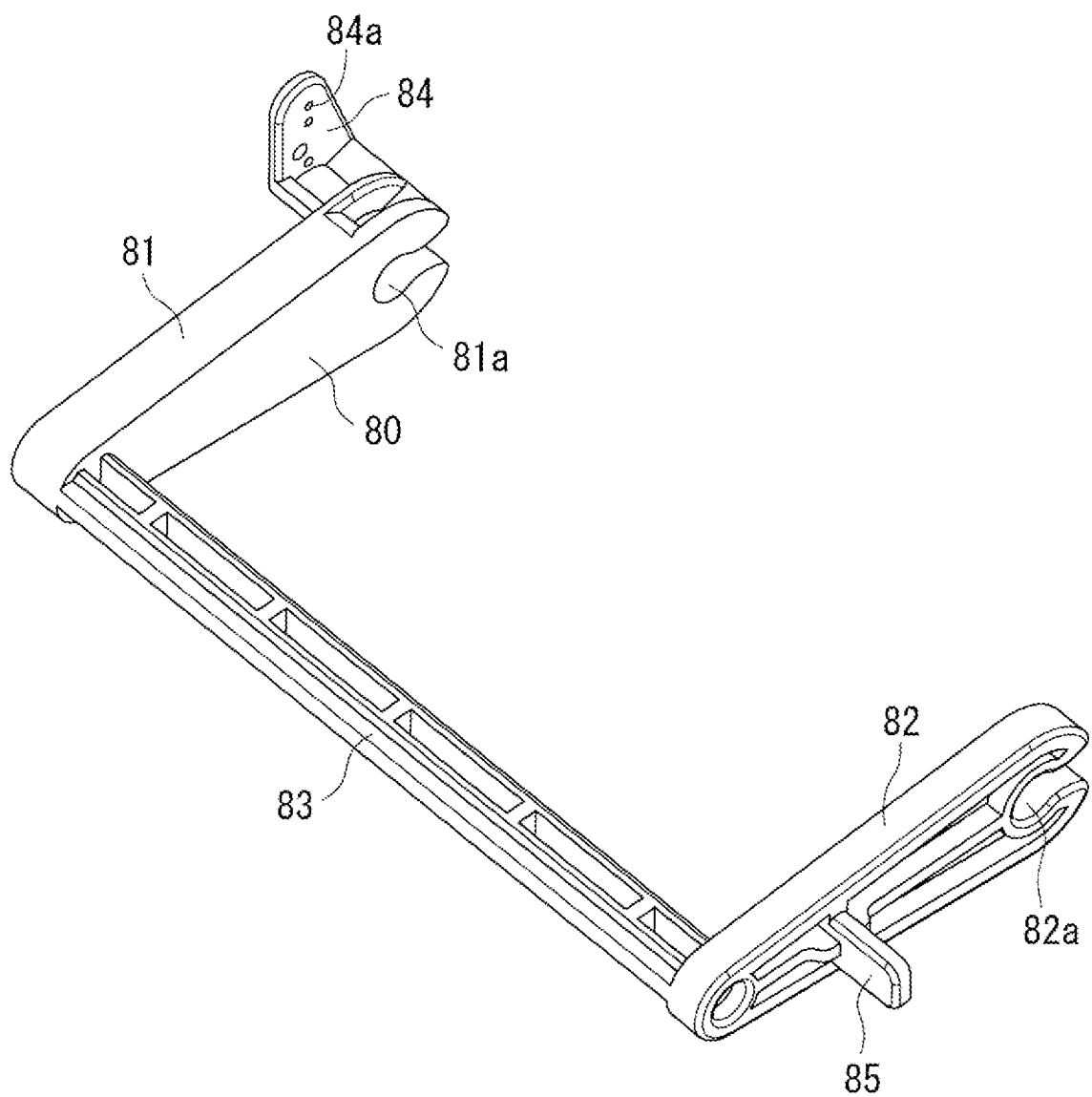
FIG. 10 is an enlarged perspective view showing a unit pressing arm extracted from FIG. 9.
Figure 11:
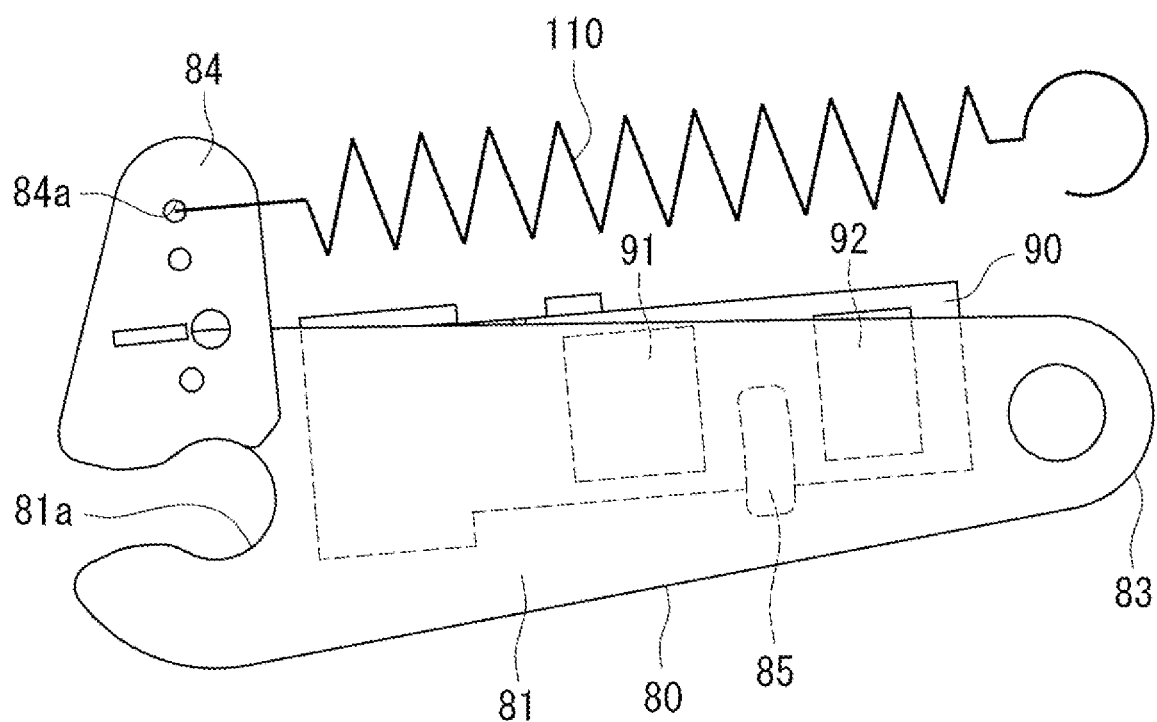
FIG. 11 is an enlarged side view showing a relationship between the unit pressing arm, a detection sensor, and a biasing member.

FIG. 10 is an enlarged perspective view showing the unit pressing arm extracted from FIG. 9. FIG. 11 is an enlarged side view showing the relationship between the unit pressing arm, the detection sensor, and the biasing member.

The unit pressing arm 80 includes a first arm extending member 81, a second arm extending member 82, a pressing member 83, a bias connecting member 84, and a detection piece 85.

The first arm extending member 81 has a first arm locking portion 81a that locks on the arm shaft 51e at one end, and is connected to the pressing member 83 at the other end. In the vicinity of the first arm locking portion 81a of the first arm extending member 81, the bias connecting member 84 is formed extending in a direction intersecting the extending direction of the first arm extending member 81. The bias connecting member 84 has a connecting hole 84a for locking the end portion of the biasing member 110. In the present embodiment, when the unit pressing arm 80 is attached to the lower housing 51c, the bias connecting member 84 extends upward from the first arm locking portion 81a.

The second arm extending member 82 is shaped substantially the same as the first arm extending member 81, and has a second arm locking portion 82a that locks on the arm shaft 51e at one end and is connected to the pressing member 83 at the other end. The second arm extending member 82 has a detection piece 85 projecting therefrom. The detection piece 85 is designed to be located near an area between the light emitting unit 91 and the light receiving unit 92 of the detection sensor 90 when the detection piece 85 is attached to the lower housing 51c. The detection sensor 90 detects weather the detection piece 85 is located between the light emitting unit 91 and the light receiving unit 92. For the sake of explanation, the position of the detection piece 85 where the light from the light emitting unit 91 is blocked and detected by the detection sensor 90 may be referred to as a detected position, while the position where the light from the light emitting unit 91 is unblocked and not detected by the detection sensor 90 may be referred to as an undetected position.

The first arm extending member 81 and the second arm extending member 82 are formed at two locations across the unit accommodating section 51d (the document feed unit 70) in the width direction when attached to the lower housing 51c, and the pressing member 83 extends from the other end of each extending member.

The pressing member 83 presses the document feed unit 70 when the open/close cover 51 is closed and is connected at its end to the first arm extending member 81 and the second arm extending member 82.

Figure 12:
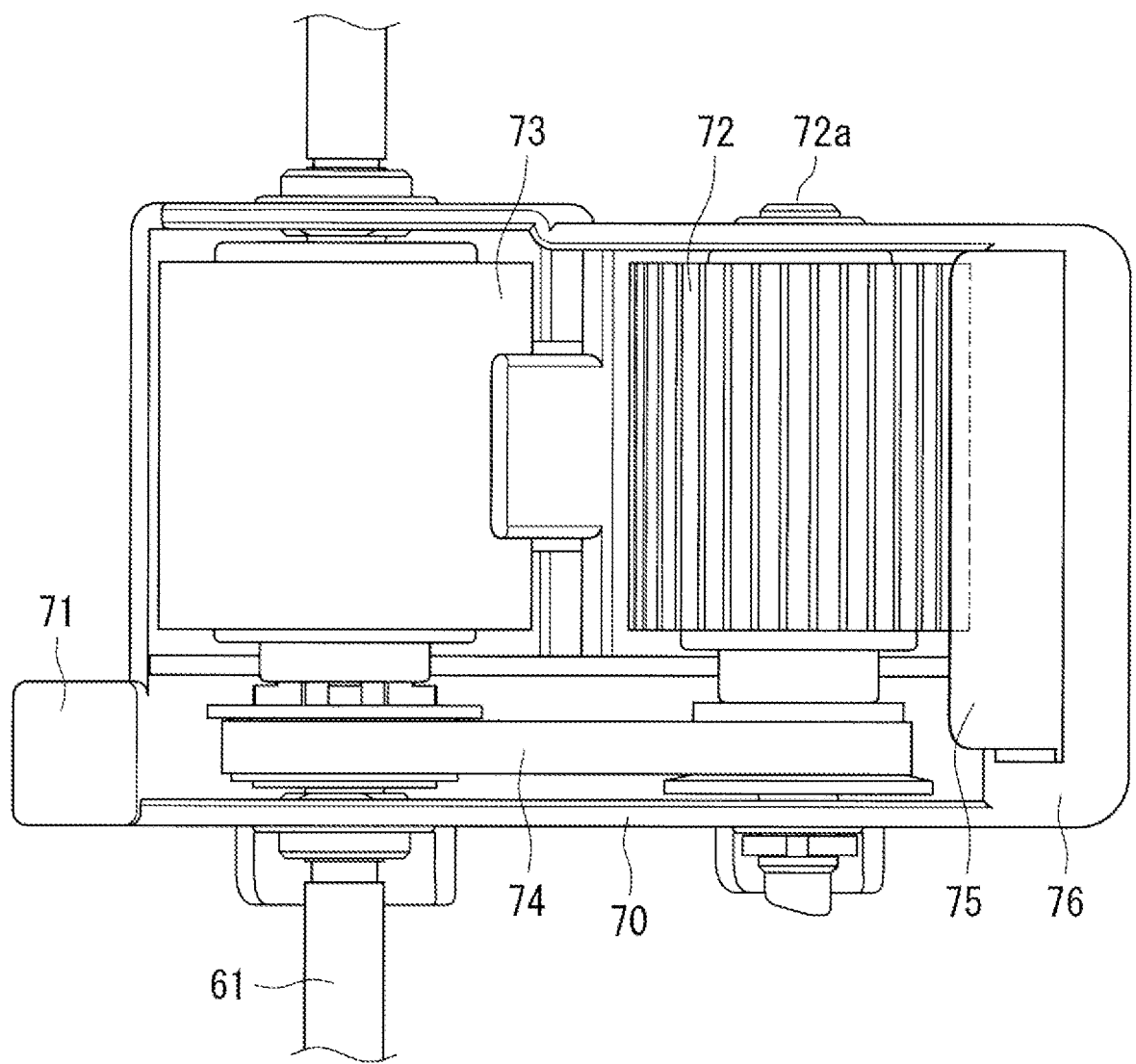
FIG. 12 is an enlarged view showing major components of the document feed unit in an enlarged manner.
Figure 13:
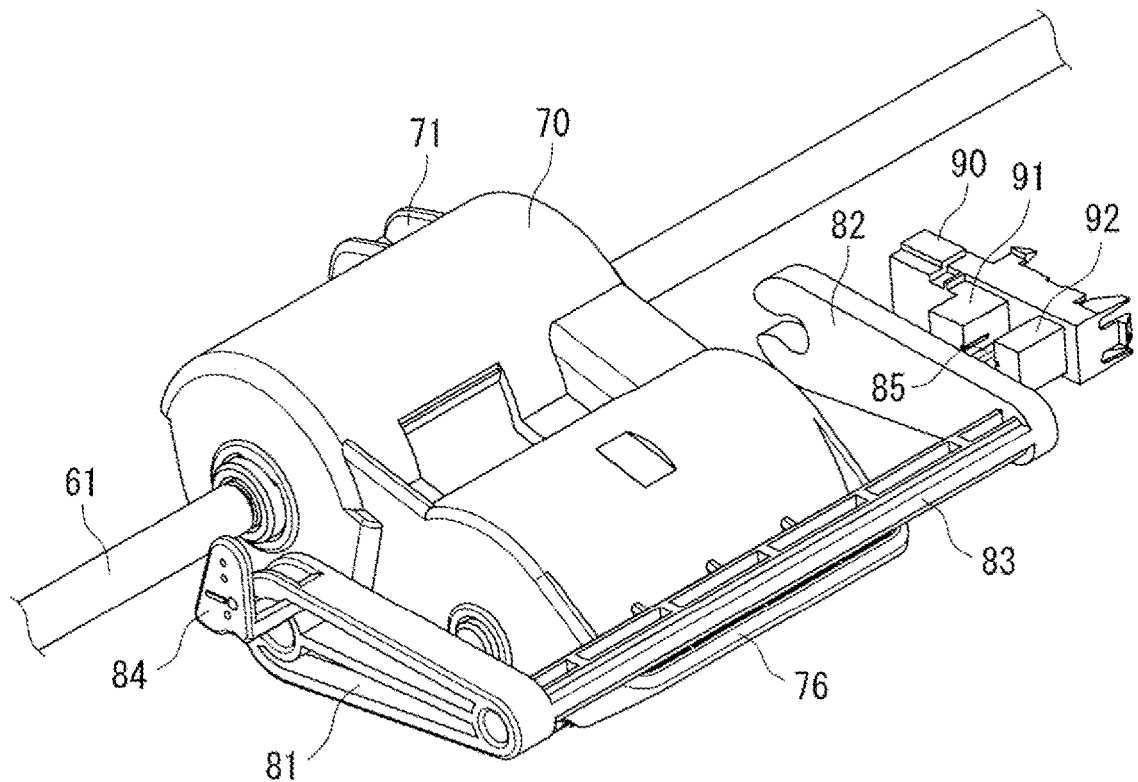
FIG. 13 is an explanatory view of major components showing a relationship between the document feed unit, a unit pressing arm, and a detection sensor.

FIG. 12 is an enlarged view of major components of the document feed unit in an enlarged manner. FIG. 13 is an explanatory view of major components showing the relationship between the document feed unit, the unit pressing arm, and the detection sensor.

FIG. 12 shows a state where the document feed unit 70 is viewed from the apparatus body 59 side (lower side). FIG. 13 shows the document feed unit 70, the unit pressing arm 80, and the detection sensor 90 in an extracted manner when the open/close cover 51 closed.

The document feed unit 70 includes a housing having an opened bottom and an inside space, and the housing accommodates the intake roller 72, the sheet feed roller 73, and the transmission belt 74. The lower portions of the intake roller 72 and the sheet feed roller 73 protrude downward from the housing to come into contact with the document passing below. The document feed unit 70 is disposed at a position straddling over the sheet feed guide plate 54 and the apparatus body 59 in the transport direction (see, for example, FIG. 5), with the intake roller 72 positioned above the sheet feed guide plate 54 and the sheet feed roller 73 positioned above the apparatus body 59.

The sheet feed roller 73 is attached to the sheet feed shaft 61 and rotates with the sheet feed shaft 61 when rotated by the driving section 56. The sheet feed roller 73 and the sheet feed shaft 61 are connected via a one-way clutch. This prevents rotation of the sheet feed shaft 61 even when the sheet feed roller 73 rotates while the driving section 56 stops.

The intake roller 72 has its own rotation shaft (call-in shaft 72a) which is pivotally supported by the document feed unit 70. The transmission belt 74 extends over the sheet feed shaft 61 and the call-in shaft 72a. When the sheet feed shaft 61 rotates by the driving section 56, the intake roller 72 rotates via the transmission belt 74. A one-way clutch is used between the intake roller 72 and the transmission belt 74 to prevent the rotation of the transmission belt 74 even when the intake roller 72 rotates while the driving section 56 is stopped.

The above-mentioned regulating protrusion 71 protrudes downward from the sheet feed roller 73 side of the housing of the document feed unit 70 in the transport direction. In the housing of the document feed unit 70, a unit contact member 76 is provided at an end on the intake roller 72 side. The unit contact member 76 comes into contact with the pressing member 83 of the unit pressing arm 80 located above the unit contact member 76. The one-way clutch may be used at any location as appropriate between the sheet feed shaft 61, the intake roller 72, the sheet feed roller 73, and the transmission belt 74. It is necessary to connect various parts to operate the one-way clutch properly whether the one-way clutch rotates by itself or by a force transmitted from various parts.

A roll-in prevention guide 75 is attached to the end of the opening of the housing of the document feed unit 70 on the intake roller 72 side. The roll-in prevention guide 75 is a thin sheet that prevents rolling of the document into the gap between the housing and the intake roller 72. Specifically, the roll-in prevention guide 75 overlaps a part of the intake roller 72 in the transport direction and covers the opening between the housing and the intake roller 72.

When the unit pressing arm 80 is attached to the lower housing 51c, the unit pressing arm is biased by the biasing member 110 and rotates about the arm shaft 51e as the fulcrum to lower the pressing member 83 side downward. This causes the pressing member 83 to press the unit contact member 76 of the document feed unit 70 located below. The document feed unit 70 swings about the sheet feed shaft 61 as the fulcrum, and the unit contact member 76 side is lowered by receiving a force from the unit pressing arm 80. As shown in FIG. 13, the pressing member 83 is longer than the unit contact member 76 in the width direction. Pressing the entire unit contact member 76 with the pressing member 83 decreases the tilt of the intake roller 72 and increases an area which is in contact with the document to reliably capture the document.

Attaching the biasing member 110 to the bias connecting member 84 allows the unit pressing arm 80 to rotate about the shaft with a simple structure. Thus, the biasing member 110 can be disposed regardless of the direction in which the unit pressing arm 80 moves, which improves the degree of freedom in design.

The extending members (the first and second arm extending members 81, 82) extend in a direction between the sheet feed shaft 61 and the unit contact member 76 which face each other. Rotating the unit pressing arm 80 around the shaft to increase the amount of movement, while positioning the unit pressing arm 80 along the document feed unit 70, contributes to the effective use of space and downsizing.

As described above, the unit pressing arm 80 is arranged so that the detection piece 85 is located near the area between the light emitting unit 91 and the light receiving unit 92 with respect to the detection sensor 90, but the unit pressing arm 80 moves downward, when rotated, to the undetected position lower than the detection position.

Figure 14:
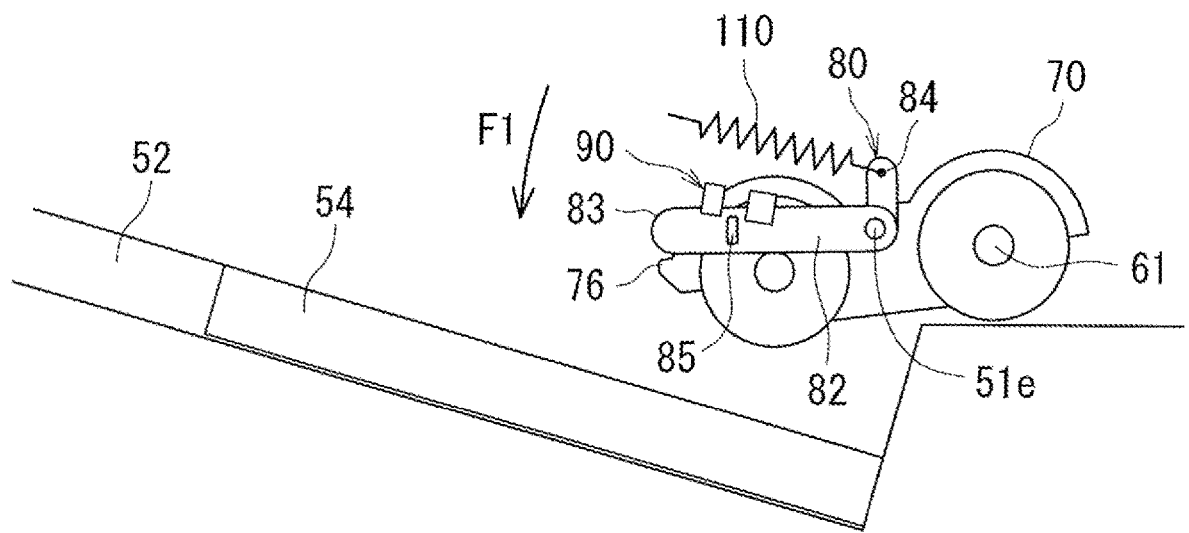
FIG. 14 is a schematic explanatory view showing the vicinity of the document feed unit in a state where the sheet feed guide plate is lowered.
Figure 15:
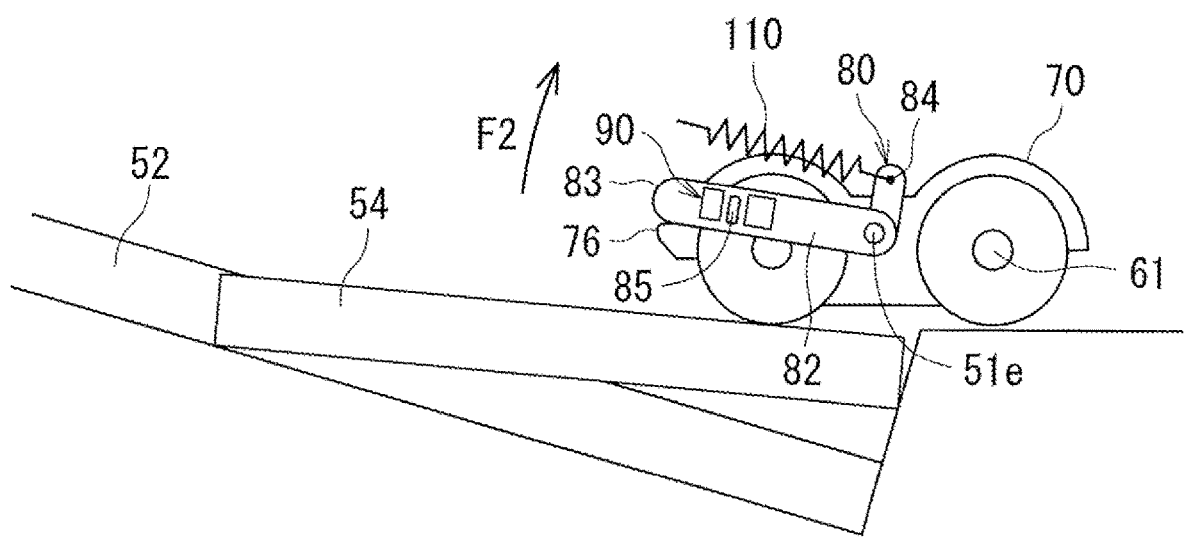
FIG. 15 is a schematic explanatory view showing the vicinity of the document feed unit in a state where the sheet feed guide plate is lifted.

Next, the movement of individual parts in transporting the document is described with reference to FIGS. 14 and 15. In FIGS. 14 and 15, the major components of the document feeder 50 are extracted and shown schematically, and other components are omitted.

FIG. 14 is a schematic explanatory view showing the vicinity of the document feed unit in a state where the sheet feed guide plate is lowered.

In FIG. 14, the sheet feed guide plate 54 is in a lowered state, and the upper surface of the sheet feed guide plate 54 is not in contact with the intake roller 72. Although FIGS. 14 and 15 do not show the document loaded on the sheet feed tray 52, the top surface of the sheet feed guide plate 54 can be regarded as the top surface of the loaded document and, in FIG. 14, the uppermost document loaded can be regarded as not being in contact with the intake roller 72.

As described above, the unit pressing arm 80 is biased by the biasing member 110 to lower the pressing member 83, and pushes down the unit contact member 76 of the document feed unit 70. Further, the detection piece 85 is located at the undetected position due to the rotation of the unit pressing arm 80 (in the direction of an arrow F1 in FIG. 14).

FIG. 15 is a schematic explanatory view showing the vicinity of the document feed unit in a state where the sheet feeding guide plate is lifted.

In FIG. 15, the sheet feed guide plate 54 is in a lifted state, and the top surface of the sheet feed guide plate 54 is in contact with the intake roller 72. When the sheet feed guide plate 54 (document) pushes up the unit contact member 76 side of the document feed unit 70 against the biasing force of the biasing member 110, the unit pressing arm 80 also rotates upward (in the direction of an arrow F2 in FIG. 15). As a result, the detection piece 85 moves to the detected position.

The document feeder 50 determines the position of the document feed unit 70 in accordance with the detection result of the detection sensor 90 and starts feeding the document when the detection sensor 90 detects the detection piece 85. To determine the presence of documents on the sheet feed tray 52, a sensor, for example, that detects the presence of documents on the sheet feed tray 52 may be provided.

Rotating the sheet feed shaft 61 by the driving section 56 causes the documents loaded on the top of the sheet feed tray 52 to be fed to the document transport path 58 one by one by the intake roller 72 and the sheet feed roller 73. As the number of documents on the sheet feed tray 52 gradually decreases and the height of the upper surface of the loaded documents becomes lower, the document feed unit 70 is pressed by the pressing member 83 and becomes gradually lowered. When the detection piece 85 is lowered to move from the detected position to the undetected position, the document feeder 50 lifts up the sheet feed guide plate 54 again and stops it at the height (detected position) where the detection sensor 90 detects the detection piece 85.

By determining the position of the document feed unit 70, it is possible to know whether the document on the sheet feed tray 52 is in contact with the document feed unit 70 and operate the document feed unit 70 at appropriate timing. The detection piece 85 is formed on the unit pressing arm 80 attached to the open/close cover 51 instead of the document feed unit 70 itself. Accordingly, opening and closing the open/close cover 51 causes no significant change of the positional relationship between the detection sensor 90 and the detection piece 85, thus simplifying the shape of the detection piece 85 and improving the detection accuracy. If the detection sensor 90 and the detection piece 85 are separately attached to the open/close cover 51 and the apparatus body 59, the open/close cover 51 needs to be opened/closed carefully to avoid contact of both components in opening/closing the open/close cover 51. In other words, one component needs to be arranged not to interfere the trajectory of moving of the other component. This impairs the degree of freedom of design.

The present embodiment includes the sheet feed guide plate 54 that can be lifted to the height where it contacts with the document feed unit 70 regardless of the height of the document. This facilitates increase in loading capacity of the sheet feed tray 52. When the number of documents decreases as being taken in sequentially, the intake roller 72 approaches the sheet feed tray 52 to come into contact with the next document and takes in the document.

The embodiments described above have been presented by way of example only, and are not intended to limit the scope of the invention. Indeed, the technical scope of the present invention is not construed only by these embodiments, but defined as recited in the appended claims. The appended claims and their equivalents are intended to cover all changes and modifications as would fall within the scope and spirit of the invention.

What is claimed is:

1. A document feeder equipped with a document feed unit that feeds a document into a document transport path, comprising:
    an apparatus body to which the document feed unit is attached;
    a sheet feed tray that moves up and down toward the document feed unit and on which the document is placed;
    an open/close cover attached openably and closably to the apparatus body and, when opened, opening the document transport path and the document feed unit;
    a unit pressing member attached to the open/close cover,
    a detection sensor attached to the open/close cover; and
    a detection piece formed on the unit pressing member and detected by the detection sensor, wherein
    the document feeder determines a position of the document feed unit in accordance with a detection result of the detection sensor, and
    the unit pressing member presses the document feed unit toward the sheet feed tray when the open/close cover is closed.

2. The document feeder according to claim 1, wherein the sheet feed tray lifts a leading edge side of the loaded document and brings the document into contact with the document feed unit.

3. The document feeder according to claim 1, further comprising:
    a sheet feed shaft pivotally supported by the apparatus body;
    a sheet feed roller attached to the sheet feed shaft;
    an intake roller rotated by a force transmitted via the sheet feed shaft; and
    a driving section that causes the sheet feed shaft to rotate, wherein
    the document feed unit pivotally supports the intake roller, swings about the sheet feed shaft as a fulcrum, and moves the intake roller toward and away from the sheet feed tray.

4. The document feeder according to claim 3, wherein the unit pressing member includes an extending member pivotally supported by the open/close cover at one end and having a pressing member that presses the document feed unit at the other end,
    the document feed unit includes a unit contact member that comes into contact with the pressing member at an end portion separated from the sheet feed shaft, and
    the extending member extends in an extending direction between the sheet feed shaft and the unit contact member which face each other.

5. The document feeder according to claim 4, further comprising:
    a biasing member that biases the pressing member in a direction of pressing the unit contact member, wherein
    the unit pressing member has a bias connecting member extending in a direction intersecting the extending direction, and
    the biasing member is attached to the open/close cover at one end and to the bias connecting member at the other end.

6. The document feeder according to claim 4, wherein the extending member is formed at two locations across the document feed unit in an axial direction along the sheet feed shaft, with the pressing member extending from the other end of each extending member, and
    the pressing member is longer than the unit contact member in the axial direction.

7. An image forming apparatus including the document feeder according to claim 1.

8. A document feeder equipped with a document feed unit that feeds a document into a document transport path, comprising:
- an apparatus body to which the document feed unit is attached;
- a sheet feed tray that moves up and down toward the document feed unit and on which the document is placed;
- an open/close cover attached openably and closably to the apparatus body and, when opened, opening the document transport path and the document feed unit; and
- a unit pressing member attached to the open/close cover, the unit pressing member including an extending member pivotally supported by the open/close cover at one end and having a pressing member that presses the document feed unit at the other end, wherein
- the document feed unit includes a unit contact member that comes into contact with the pressing member at an end portion separated from a sheet feed shaft pivotally supported by the apparatus body,
- the extending member extends in an extending direction between the sheet feed shaft and the unit contact member which face each other, and the unit pressing member presses the document feed unit toward the sheet feed tray when the open/close cover is closed.

9. The document feeder according to claim 8, further comprising:
- a detection sensor attached to the open/close cover; and
- a detection piece formed on the unit pressing member and detected by the detection sensor, wherein
- the document feeder determines a position of the document feed unit in accordance with a detection result of the detection sensor.

10. The document feeder according to claim 8, wherein
- the sheet feed tray lifts a leading edge side of the loaded document and brings the document into contact with the document feed unit.

11. The document feeder according to claim 8, further comprising:
- a sheet feed roller attached to the sheet feed shaft;
- an intake roller rotated by a force transmitted via the sheet feed shaft; and
- a driving section that causes the sheet feed shaft to rotate, wherein
- the document feed unit pivotally supports the intake roller, swings about the sheet feed shaft as a fulcrum, and moves the intake roller toward and away from the sheet feed tray.

12. The document feeder according to claim 8, further comprising:
- a biasing member that biases the pressing member in a direction of pressing the unit contact member, wherein
- the unit pressing member has a bias connecting member extending in a direction intersecting the extending direction, and
- the biasing member is attached to the open/close cover at one end and to the bias connecting member at the other end.

13. The document feeder according to claim 8, wherein
- the extending member is formed at two locations across the document feed unit in an axial direction along the sheet feed shaft, with the pressing member extending from the other end of each extending member, and
- the pressing member is longer than the unit contact member in the axial direction.

14. An image forming apparatus including the document feeder according to claim 8.

* * * * *